(12) United States Patent
Liu et al.

(10) Patent No.: US 10,777,818 B2
(45) Date of Patent: Sep. 15, 2020

(54) AQUEOUS BINDER FOR LITHIUM ION BATTERY, PREPARATION METHOD THEREFOR AND USE THEREOF

(71) Applicant: SHENZHEN BTR NEW ENERGY MATERIALS INC., Shenzhen (CN)

(72) Inventors: Jun Liu, Shenzhen (CN); Jianguo Ren, Shenzhen (CN); Min Yue, Shenzhen (CN); Miaomiao Li, Shenzhen (CN)

(73) Assignee: YANYI NEW ENERGY TECHNOLOGY CO., LTD., Xuancheng (CN)

( * ) Notice: Subject to any disclaimer, the term of this patent is extended or adjusted under 35 U.S.C. 154(b) by 238 days.

(21) Appl. No.: 15/755,237

(22) PCT Filed: Aug. 25, 2016

(86) PCT No.: PCT/CN2016/096669
§ 371 (c)(1),
(2) Date: Feb. 26, 2018

(87) PCT Pub. No.: WO2017/032320
PCT Pub. Date: Mar. 2, 2017

(65) Prior Publication Data
US 2018/0248191 A1 Aug. 30, 2018

(30) Foreign Application Priority Data
Aug. 26, 2015 (CN) .......................... 2015 1 0530760

(51) Int. Cl.
*H01M 4/62* (2006.01)
*C08F 220/32* (2006.01)
(Continued)

(52) U.S. Cl.
CPC ........... *H01M 4/622* (2013.01); *C08F 220/06* (2013.01); *C08F 220/14* (2013.01);
(Continued)

(58) Field of Classification Search
CPC ..... H01M 4/621; H01M 4/622; C08F 220/04; C08F 220/06; C08F 292/00; C08F 251/02;
(Continued)

(56) References Cited

U.S. PATENT DOCUMENTS

2014/0349184 A1 11/2014 Chu et al.

FOREIGN PATENT DOCUMENTS

| CN | 1814629 | 8/2006 |
| CN | 1944479 A | 4/2007 |

(Continued)

OTHER PUBLICATIONS

International Search Report from corresponding PCT Application, dated Oct. 19, 2016.
(Continued)

*Primary Examiner* — Kregg T Brooks
(74) *Attorney, Agent, or Firm* — Sandberg Phoenix & von Gontard, P.C.

(57) ABSTRACT

An aqueous binder for a lithium ion battery, a preparation method and a use thereof. The binder is an inorganic-organic composite emulsion, comprising a dispersing agent, inorganic nanoparticles, (methyl)acrylate monomers, unsaturated carboxylic acid monomers, vinyl hydrocarbon monomers and optionally copolymers of other copolymerizable monomers, wherein the dispersing agent is a water-soluble cellulose grafted amphiphilic copolymer. When the water-soluble cellulose grafted amphiphilic copolymer is used as the dispersing agent, the agglomeration of the nanoparticles when the binder is formed into a film can be avoided, and at the same time, the effects of toughening and improving the binding strength can be achieved. Meanwhile, the water-soluble cellulose has certain strengthening and toughening properties so that the aqueous binder has an excellent (Continued)

anti-tensile performance. The aqueous binder for a lithium ion battery can be used for lithium ion batteries.

20 Claims, 1 Drawing Sheet

(51) Int. Cl.
| | |
|---|---|
| C08F 220/06 | (2006.01) |
| C08F 220/14 | (2006.01) |
| C08F 220/28 | (2006.01) |
| C08F 292/00 | (2006.01) |
| C08F 220/18 | (2006.01) |
| C09J 151/02 | (2006.01) |
| C09J 11/08 | (2006.01) |
| C09J 11/04 | (2006.01) |
| C09J 133/12 | (2006.01) |
| C08F 212/14 | (2006.01) |
| C08F 12/30 | (2006.01) |
| H01M 10/0525 | (2010.01) |
| H01M 4/02 | (2006.01) |

(52) U.S. Cl.
CPC .......... *C08F 220/18* (2013.01); *C08F 220/28* (2013.01); *C08F 220/32* (2013.01); *C08F 292/00* (2013.01); *C09J 11/04* (2013.01); *C09J 11/08* (2013.01); *C09J 133/12* (2013.01); *C09J 151/02* (2013.01); *H01M 4/621* (2013.01); *C08F 12/30* (2013.01); *C08F 212/14* (2013.01); *H01M 10/0525* (2013.01); *H01M 2004/027* (2013.01)

(58) Field of Classification Search
CPC ......... C08L 33/02; C08L 51/02; C09J 133/02; C09J 151/02; C09D 133/02
See application file for complete search history.

(56) References Cited

FOREIGN PATENT DOCUMENTS

| | | |
|---|---|---|
| CN | 102533186 | 7/2012 |
| CN | 102875722 | 1/2013 |
| CN | 105131875 | 12/2015 |

OTHER PUBLICATIONS

Written Opinion from corresponding PCT Application, dated Oct. 19, 2016.

AQUEOUS BINDER FOR LITHIUM ION BATTERY, PREPARATION METHOD THEREFOR AND USE THEREOF

CROSS-REFERENCE TO RELATED APPLICATIONS

The present application is the US National Stage under 35 U.S.C. § 371 of International Application No. PCT/CN2016/096669, filed Aug. 25, 2016, and which claims priority to Chinese Application No. 201510530760.8 filed Aug. 26, 2015.

TECHNICAL FIELD

The present invention belongs to the field of lithium ion batteries and relates to an electrode material for a lithium ion secondary battery, specifically to an aqueous binder for a lithium ion secondary battery, a preparation method and use thereof.

BACKGROUND ART

Lithium-ion batteries quickly occupied the high-end rechargeable battery market after the first commercialization of lithium-ion battery by Japanese Sony Company in the early nineties in the last century. Lithium-ion battery, as a new type of clean energy, has characters of high specific energy density, high working voltage, long cycle life and no memory effect, etc. Currently, lithium-ion batteries are considered as the most promising mobile energy storage technologies in the mobile electronics, electric vehicle industry and other recycling energy systems.

At present, lithium-ion batteries generally use graphite-based carbon materials as an active material for negative electrode, such materials have a small change in volume in the charge-discharge cycle. However, such carbon materials have low battery capacity. For example, high crystallinity graphite has a theoretical capacity of 372 mAh/g. However, when using a material having high discharge capacity, such as silicon, tin, or a silicon-tin alloy, as an active material for negative electrode, the volume change is large and the materials deteriorates easily. For example, there is a volume expansion rate which is up to 300% during lithium insertion of a silicon-based active material, the expansion stress causes the structure of the silicon-based material to be crushed, thereby breaking the conductive connection between the active material of the electrode material and the current collector and thus degrading the electrode pole piece.

In order to solve the problems such as deformation and deterioration of the battery caused by the cycle volume expansion of the negative electrode non-carbonaceous active material, it is necessary to develop a binder having high adhesive strength and capable of uniformly dispersing the expansion stress to realize the cycle stability of negative electrode of high-capacity non-carbonaceous active material.

Patents CN103242595 and CN101243566A respectively disclose an inorganic nano-particle composite binder, which improves the tensile strength by adding nanometer inorganic fillers (such as nano-silica) and carbon nanotubes and is used as a binder for negative electrode of non-carbonaceous active material having high capacity and high volume expansion rate. However, although the size and surface morphology of the nanoparticles are controlled in advance, agglomeration of the inorganic nano-particles during the film formation of the binder inevitably occurs in the physical compound method, which will affect the uniform stability of pole piece. Patent CN102875722A discloses a strong adhesive type inorganic-organic composite binder prepared by a method based on in-situ emulsion polymerization of carbon nanotube. However, at present, there is not yet a functional adhesive having high volume expansion rate which has excellent adhesive strength and meanwhile exhibits higher flexibility, and is particularly suitable for silicon-based negative electrode active materials.

The incorporation of inorganic nanoparticles into an inorganic-organic composite emulsion can improve the film-forming property of the emulsion and enhance the mechanical properties of latex film. At present, inorganic-organic composite emulsions are mainly prepared by a simple physical blending method, and the main problem of this method is that inorganic nano-particles are difficult to disperse uniformly in aqueous media. To this end, by in-situ emulsion polymerization, uniform uniform coating of the inorganic nano-particles by polymers is achieved to prepare core-shell particles.

Patent CN1944479A discloses a polyacrylate composite emulsion of inorganic-organic composite latex particles having a core/shell structure for pressure-sensitive adhesives. The latex particles composing the composite emulsion has a core-shell structure with silane cross-linking agent surface-modified nano-silica as the core and the copolymer of acrylate and acrylic acid monomers as the shell, has a solid content of 30-40%, a viscosity of 1-6 MPA·S, a particle size of the 250-700 nm, and a particle size distribution index of 0.005-0.15. The preparation method thereof comprises the following steps: preparing nano-silica alcohol sol, surface modifying nano-silica and preparing nano-silica-polyacrylate composite emulsion. The composite emulsion coating film was dried to obtain acrylate pressure-sensitive adhesive. By this, the initial adhesion and cohesion performance of pressure-sensitive adhesive are improves, nano-silica particles are dispersed in the polyacrylate pressure-sensitive adhesive matrix, and the thickness of core layer and shell layer latex particle can be controlled. However, in the process of preparing inorganic-organic composite emulsion by this method, small-molecule emulsifier is used, and most of the nano-silica particles are still agglomerated due to non-uniform dispersion. Meanwhile, the small molecule emulsifier affects the solvent resistance of the adhesive.

CONTENTS OF THE INVENTION

In view of the problems in the prior art, one of the purposes of the present invention is to provide an aqueous binder for lithium ion battery electrode material with excellent bonding strength and flexibility.

In order to solve the above problems, the present inventors conducted intensive researches to study the relationship between the molecular chain structure of a polymer and microstructure of a polymer/inorganic nanocomposite and the properties of a lithium ion battery, starting from an aqueous binder for a lithium ion battery. At the same time, it is noted that when binder is used in lithium ion batteries, small molecule emulsifier has a nonnegligible negative impact on battery performance. The present inventors have found that when a water-soluble cellulose grafted with amphiphilic copolymer is used as a dispersant, when the binder is formed into a film, the agglomeration of the nanoparticles can be avoided, while the effects of toughening and improving the binding strength are achieved. Meanwhile, the water-soluble cellulose has certain strengthening and toughening properties so that the aqueous binder of the present invention has an excellent anti-tensile performance.

In order to achieve the above purpose, the present invention utilizes the following technical solution:

An aqueous binder for a lithium ion battery, which is an inorganic-organic composite emulsion comprising a dispersing agent, inorganic nanoparticles, and copolymers of (methyl)acrylate monomers, unsaturated carboxylic acid monomers, vinyl hydrocarbon monomers and optionally other copolymerizable monomers, wherein the dispersing agent is a water-soluble cellulose grafted amphiphilic copolymer.

Preferably, the dispersant has a weight average molecular weight of 100-1,000,000. If the molecular weight of the dispersant is too low, dispersibility is weakened, and tensile property of the binder is poor; if the molecular weight is too large, flocculation of latex particles is easily caused during preparation of the emulsion.

Preferably, the dispersant is in an amount of 0.5-25% of the total mass of solids of the composite emulsion, such as 2%, 4%, 6%, 8%, 10%, 12%, 14%, 16%, 18%, 20%, 22% or 24%. When the mass fraction of the dispersant for the inorganic-organic composite emulsion is in the above range, the binder of the present invention can easily have excellent adhesive strength and the negative electrode active material has a good dispersibility.

Preferably, the mass ratio of water-soluble cellulose to amphiphilic copolymer is 2/98 to 40/60. The reason is that when the mass ratio of the water-soluble cellulose to the amphiphilic copolymer is too low, the tensile strength of the binder is weakened and the dispersibility is deteriorated; when the mass ratio is too high, the graft amount is large, making the molecular weight is too high and thus easily leading to flocculation of latex particles during preparation of the emulsion.

Preferably, the water-soluble cellulose is any one of sodium carboxymethylcellulose, sodium carboxyethylcellulose, hydroxymethylcellulose, hydroxyethylcellulose or hydroxypropylcellulose, or a mixture of at least two of them.

Preferably, the water-soluble cellulose has a viscosity of 20-3500 mPa/s in an aqueous solution with a mass fraction of 1%.

Preferably, the water-soluble cellulose contains a hydroxyl group capable of grafting, having a chemical formula of —OH, and the hydroxyl group has a mass fraction of 10-20 wt % of the mass of the water-soluble cellulose, for example, 11 wt %, 12 wt %, 13 wt %, 14 wt %, 15 wt %, 16 wt %, 17 wt %, 18 wt %, or 19 wt %.

Preferably, the comonomers of the amphiphilic copolymer comprise hydrophilic monomer, hydrophobic monomer, optionally amphiphilic monomer, and optionally crosslinking monomer.

The amphiphilic copolymer can be prepared from the above comonomers by emulsion polymerization.

Preferably, the hydrophilic monomer is selected from any one of fumaric acid, (meth)acrylic acid, itaconic acid, sodium p-styrene sulfonate, sodium vinylsulfonate, sodium allylsulfonate, sodium 2-methylallyl sulfonate, sodium ethyl methacrylate sulfonate, (meth)acrylamide, N-methylol acrylamide, N,N-dimethylacrylamide or 2-acrylamide-2-methylpropanesulfonic acid, or a combination of at least two of them.

Preferably, the hydrophobic monomer is preferably selected from any one of styrene, methyl (meth)acrylate, ethyl (meth)acrylate, butyl (meth)acrylate or 2-ethylhexyl (meth)acrylate, or a combination of at least two of them.

Preferably, the amphiphilic monomer is selected from any one of lauryl alcohol polyoxyethylene ether (meth)acrylate, stearic acid polyoxyethylene ether (meth)acrylate or nonylphenol polyoxyethylene ether (meth)acrylate, or a combination of at least two of them.

In the present invention, the dispersant is provided with a certain branched network structure by using a crosslinking monomer, so as to suppress expansion and improve peeling strength. Preferably, the crosslinking monomer is selected from any one of glycidyl (meth)acrylate, methylene bisacrylamide, divinylbenzene or (ethylene glycol)$_n$ di(meth)acrylate (n=1-35, for example 2, 3, 5, 7, 9, 12, 15, 18, 21, 24, 27, 30 or 33), or a combination of at least two of them. If the present invention uses a crosslinking monomer of (ethylene glycol)$_n$ di(meth)acrylate, the flexibility of the crosslinked network structure can be adjusted by controlling the value of n. For example, when n=1-5, the crosslinked network structure is rigid; when $6 \leq n \leq 35$, the crosslinked network structure has strong flexibility and tensile strength.

Preferably, the mass ratio of hydrophilic monomer to hydrophobic monomer is 10/100 to 80/20, for example 20/100, 30/100, 50/100, 70/100, 1:1, 2:1 or 3:1. When the mass ratio of hydrophilic monomer and hydrophobic monomer is too high, the dispersant has a high viscosity and thus it is difficult to prepare a uniform and stable emulsion. However, when the mass ratio is too low, the water solubility of the dispersant is deteriorated and the dispersibility is diminished.

Preferably, the amphiphilic monomer is added in an amount of 0-40 wt % of the mass of the amphiphilic copolymer, for example 5 wt %, 10 wt %, 15 wt %, 20 wt %, 25 wt %, 30 wt % or 35 wt %.

Preferably, the crosslinking monomer is added in an amount of 0.01-5 wt % of the mass of the amphiphilic copolymer, for example 0.5 wt %, 1 wt %, 1.5 wt %, 2 wt %, 2.5 wt %, 3 wt %, 3.5 wt %, 4 wt % or 4.5 wt %.

Preferably, the inorganic nanoparticle is any one of silica, alumina, aluminum silicate, calcium sulfate or wollastonite, or a combination of at least two of them. As a functional type lithium ion battery binder having excellent adhesive strength of the present invention, it is preferable to use nano-silica as the inorganic nanoparticles.

Preferably, the inorganic nanoparticles have a particle size of 20-200 nm, more preferably 20-120 nm.

Preferably, the inorganic nanoparticles are surface-modified by a silane coupling agent. After surface modification, the inorganic nanoparticles contain a polymerizable double bond, and can undergo graft reaction when reacting with the comonomers of the copolymer to form a core-shell structure.

Preferably, the mass ratio of silane coupling agent to inorganic nanoparticles is 0.01-0.3/1.

Preferably, the silane coupling agent is any one of vinyltrimethoxysilane, vinyltriethoxysilane, vinyltris(β-methoxyethoxy)silane, γ-methacryloxypropyl trimethoxysilane or γ-methacryloxypropyltriethoxysilane, or a combination of at least two of them.

Preferably, the (meth)acrylate monomer is selected from any one of methyl acrylate, ethyl acrylate, butyl acrylate, isobutyl acrylate, n-pentyl acrylate, isoamyl acrylate, n-hexyl acrylate, isooctyl acrylate, hydroxypropyl acrylate, 2-hydroxyethyl acrylate, lauryl acrylate, methyl methacrylate, ethyl methacrylate, butyl methacrylate, isobutyl methacrylate, n-pentyl methacrylate, n-hexyl methacrylate, isooctyl methacrylate, hydroxypropyl methacrylate or 2-hydroxyethyl methacrylate, or a combination of at least two of them.

Preferably, the unsaturated carboxylic acid monomer is selected from any one of lithium acrylate, acrylic acid, lithium methacrylate, methacrylic acid, lithium itaconate or itaconic acid, or a combination of at least two of them.

Preferably, the vinyl hydrocarbon monomer is selected from any one of vinyl acetate, styrene, α-methyl styrene, sodium styrene sulfonate or sodium methyl vinyl sulfonate, or a combination of at least two of them.

Preferably, the optional other copolymerizable monomer is selected from any one of acrylamides such as acrylamide and N-methylolacrylamide; heterocyclic vinyls such as N-vinylpyrrolidone, vinylpyridine and vinylimidazole; vinyl esters such as vinyl acetate, vinyl propionate or vinyl butyrate; or a mixture of at least two of them.

Preferably, the mass ratio of inorganic nanoparticles to copolymers of (methyl)acrylate monomers, unsaturated carboxylic acid monomers, vinyl hydrocarbon monomers and optionally other copolymerizable monomers is 0.001-6/99.999-94.

Preferably, the sum of mass of the inorganic nanoparticles and the copolymers of (methyl)acrylate monomers, unsaturated carboxylic acid monomers, vinyl hydrocarbon monomers and optionally other copolymerizable monomers is 25-55 wt % of the mass of the composite emulsion, for example 30 wt %, 35 wt %, 40 wt %, 45 wt %, 50 wt % or 55 wt %.

Preferably, the composite emulsion has a core-shell structure, wherein the copolymer is a shell layer, and the shell layer has more than one layer, that is, at least two layers.

Preferably, in the composite emulsion having a core-shell structure, the copolymer of the innermost layer has a glass transition temperature lower than that of the copolymer of the outermost layer.

The present invention can effectively adjust the glass transition temperature of the copolymer of each layer by giving preference to the (meth)acryliate monomer, unsaturated carboxylic acid monomer, vinyl hydrocarbon monomer, and optionally other copolymerizable monomer while determining the appropriate monomer ratio. Without any special limitation, the monomer having a glass transition temperature Tg>40° C. is generally referred to as a hard monomer, and is capable of giving a binder tensile strength; the monomer having a glass transition temperature Tg<−10° C. is referred to as a soft monomer, which gives the adhesive flexibility and broadens low-temperature serviceability of the adhesive; the monomer having a glass transition temperature −10° C.<Tg<40° C. is referred to as a "moderate-monomer". Examples of monomers that can be used are listed below. The contents in the brackets following the monomers are glass transition temperature (unit: ° C.).

Examples of the hard monomer may include methyl methacrylate (105), ethyl methacrylate (65), 2-hydroxyethyl methacrylate (55), acrylamide (165), and styrene (100). Examples of the soft monomers may include ethyl acrylate (−24), butyl acrylate (−55), isobutyl acrylate (−40), isooctyl acrylate (−70), and hydroxyethyl acrylate (−15). Examples of the moderate monomer may include methyl acrylate (8), hydroxypropyl acrylate (−7), butyl methacrylate (20) and vinyl acetate (28).

Preferably, the number of shell layers is more than one, the glass transition temperatures of adjacent shell layers differ by −30 to 30° C., and the glass transition temperature of the inner shell layer is −25 to 30° C.

Preferably, the composite emulsion has a core-shell structure and the inorganic nanoparticles are cores.

Preferably, the composite emulsion has a glass transition temperature of −30 to 90° C.

Preferably, the composite emulsion has a pH of 6-10.

Preferably, the composite emulsion has a solid content of 25-55 wt %;

Preferably, the latex particles of composite emulsion have a size of 50-300 nm.

Preferably, the composite emulsion is prepared by in-situ polymerization. The present inventors have found that by preparing a water-soluble dispersant from a water-soluble cellulose which is modified by graft polymerization, and using the water-soluble dispersant for in-situ polymerization of inorganic nanoparticles to produce an inorganic-organic composite emulsion, agglomeration of nanoparticles during film formation of binder is avoid and the effects of toughening and improving the binding strength are achieved.

The second purpose of the present invention is to provide a method for producing the aqueous binder for a lithium ion battery as described above, which comprises in-situ polymerizing a dispersant, inorganic nanoparticles and (meth)acrylate monomers, unsaturated carboxylic acid monomers, vinyl hydrocarbon monomers, and optionally other copolymerizable monomers, to obtain the above aqueous binder.

Preferably, the dispersing agent is prepared by free radical polymerization of water-soluble cellulose and comonomers of amphiphilic copolymer.

Preferably, the water-soluble cellulose has a viscosity of 20-3500 mPa/s in an aqueous solution with a mass fraction of 1%.

Preferably, the water-soluble cellulose contains a hydroxyl group capable of grafting, and the hydroxyl group has a mass fraction of 10-20 wt % of the mass of the water-soluble cellulose, for example, 11 wt %, 12 wt %, 13 wt %, 14 wt %, 15 wt %, 16 wt %, 17 wt %, 18 wt %, or 19 wt %.

Preferably, the mass ratio of water-soluble cellulose to amphiphilic copolymer is 2/98 to 40/60.

Preferably, the comonomers of amphiphilic copolymer comprise hydrophilic monomer, hydrophobic monomer, optionally amphiphilic monomer, and optionally crosslinking monomer.

Preferably, the mass ratio of hydrophilic monomer to hydrophobic monomer is 10/100 to 80/20, for example 20/100, 30/100, 50/100, 70/100, 1:1, 2:1 or 3:1.

Preferably, the amphiphilic monomer is added in an amount of 0-40 wt % of the mass of the amphiphilic copolymer, for example 5 wt %, 10 wt %, 15 wt %, 20 wt %, 25 wt %, 30 wt % or 35 wt %.

Preferably, the crosslinking monomer is added in an amount of 0.01-5 wt % of the mass of the amphiphilic copolymer, for example 0.5 wt %, 1 wt %, 1.5 wt %, 2 wt %, 2.5 wt %, 3 wt %, 3.5 wt %, 4 wt % or 4.5 wt %.

Preferably, when preparing the dispersant, a chain transfer agent is added in an amount of 0.01-5% of the mass of the comonomers of the amphiphilic copolymer to adjust molecular weight.

Preferably, the chain transfer agent is selected from any one of dodecyl mercaptan, tert-dodecyl mercaptan or isooctyl thioglycolate, or a combination of at least two of them.

Preferably, the dispersing agent is prepared using a free radical polymerization system, wherein the radical polymerization system is previously neutralized with a 10-20% alkaline compound aqueous solution to a pH of 5-8.

Preferably, the alkaline compound is any one of lithium hydroxide, sodium hydroxide, potassium hydroxide or sodium bicarbonate, or a combination of at least two of them.

Preferably, the inorganic nanoparticles are surface-modified with a silane coupling agent. The surface modification method is as follows:

a silane coupling agent was added to an alcohol-water solution of the inorganic nanoparticles and the pH of the solution was adjusted (for example, ammonia can be used to adjust the pH) to 8-10, and then the mixture was stirred and reacted at 20-70° C. for 3-24 hours to obtain surface-modified inorganic nanoparticles (containing polymerizable double bonds).

Preferably, the inorganic nanoparticles have a particle size of 20-200 nm, further preferably 20-120 nm.

Preferably, the mass ratio of silane coupling agent to inorganic nanoparticles is 0.01-0.3/1.

Preferably, the silane coupling agent is any one of vinyltrimethoxysilane, vinyltriethoxysilane, vinyltris(β-methoxyethoxy)silane, γ-methacryloxypropyl trimethoxysilane or γ-methacryloxypropyltriethoxysilane, or a combination of at least two of them.

An exemplary alcohol-water solution is ethanol-water dispersion liquid.

Preferably, the in-situ polymerization of dispersant, inorganic nanoparticles and (meth)acrylate monomers, unsaturated carboxylic acid monomers, vinyl hydrocarbon monomers, and optionally other copolymerizable monomers includes the following steps:

(a) adding inorganic nanoparticles to an aqueous solution of a dispersant, and after dispersing, adding (meth)acrylate monomers, unsaturated carboxylic acid monomers, vinyl hydrocarbon monomers, and optionally other copolymerizable monomers and an initiator; carrying out polymerization under stirring to obtain an inorganic-organic seed composite emulsion;

(b) adding (meth)acrylate monomer, unsaturated carboxylic acid monomer, vinyl hydrocarbon monomer, optionally other copolymerizable monomer and an initiator to the inorganic-organic seed composite emulsion, and carrying out polymerization under stirring to obtain an inorganic-organic composite emulsion, that is, an aqueous binder for a lithium ion battery.

Preferably, step (b) is repeated 1-3 times.

Preferably, in step (a), the dispersant is in an amount of 1-25% of the total mass of (meth)acrylate monomer, unsaturated carboxylic acid monomer, vinyl hydrocarbon monomer and optionally other copolymerizable monomer, for example 2%, 4%, 8%, 10%, 12%, 14%, 16%, 18%, 20%, 22% or 24%. With this amount of dispersant, the dispersant in the resulting product has an amount of 0.5-15% of the mass of the emulsion.

Preferably, in step (a), the mass fraction of the inorganic nanoparticles is 0.1-25 wt % of the solid mass of the dispersant.

Preferably, in step (a), the dispersion is performed for not less than 20 minutes, preferably for 28-100 minutes, and more preferably for 30-60 minutes with an emulsifying and dispersing machine at 300-3,000 rpm to disperse the inorganic nanoparticles.

Preferably, the polymerization reaction time in step (a) is 3-6 h.

Preferably, in both step (a) and step (b), comonomers and initiator are added and polymerization is performed independently at 30-90° C., preferably 60-90° C.

Preferably, the initiator is any one of organic peroxide initiator, inorganic peroxide initiator or redox initiator, or a combination of at least two of them.

Preferably, the organic peroxide initiator is selected from benzoyl peroxide and/or dicumyl peroxide.

Preferably, the inorganic peroxide initiator is selected from ammonium persulfate, sodium persulfate or potassium persulfate.

Preferably, the redox initiator is selected from a combination of ammonium persulfate/sodium sulfite, or a combination of ammonium persulfate/sodium bisulfite.

Preferably, the mass of the initiator is 0.1-2 wt % of the total mass of (meth)acrylate monomer, unsaturated carboxylic acid monomer, vinyl hydrocarbon monomer, and optionally other copolymerizable monomer, for example 0.3 wt %, 0.5 wt %, 0.7 wt %, 0.9 wt %, 1.1 wt %, 1.3 wt %, 1.5 wt %, 1.7 wt % or 1.9 wt %.

Preferably, the mass of (meth)acrylate monomer, unsaturated carboxylic acid monomer, vinyl hydrocarbon monomer and optionally other copolymerizable monomer in step (b) is 15-85 wt % of the total mass of (meth)acrylate monomer, unsaturated carboxylic acid monomer, vinyl hydrocarbon monomer, and optionally other copolymerizable monomer. Said total mass of (meth)acrylate monomer, unsaturated carboxylic acid monomer, vinyl hydrocarbon monomer and optionally other copolymerizable monomer is the total mass of (meth)acrylate monomer, unsaturated carboxylic acid monomer, vinyl hydrocarbon monomer and optionally other copolymerizable monomer added in step (a) and step (b). If the mass fraction of monomers added in step (b) is controlled within the above range in the present invention, the binder has excellent toughness and adhesive strength. If the mass fraction of monomers added in step (b) is too high, the toughness of the binder would be poor; if the mass fraction is too low, the adhesive strength would be reduced.

Preferably, the method further comprises: adjusting the pH of the composite emulsion when the polymerization reaction is completed, and preferably adjusting the pH of the composite emulsion to be 6-10.

Preferably, this pH adjustment can be achieved by alkali neutralization.

The alkaline compounds used for the alkali neutralization are all alkaline compounds well known to those skilled in the art, in particular the alkaline compounds which are not volatile during drying and curing such as lithium hydroxide, sodium hydroxide, potassium hydroxide or sodium bicarbonate are used, and a solution having a mass fraction of 10-30% is prepared.

Preferably, the inorganic-organic seed composite emulsion has a glass transition temperature of −30 to 90° C., further preferably −25 to 30° C.

Preferably, the latex particles of inorganic-organic composite emulsion have a particle size of 50-300 nm.

Preferably, the inorganic-organic composite emulsion has a glass transition temperature of −30 to 90° C., further preferably −15 to 90° C.

Preferably, the method for preparing the aqueous binder for a lithium ion battery includes the following steps:

(1) preparing a dispersant by free radical polymerization of water-soluble cellulose and comonomers of amphiphilic copolymer;

(2) adding a silane coupling agent to an alcohol-water mixed solution of inorganic nanoparticles, adjusting the pH to 8-10 with ammonia, and then stirring and reacting the mixture at 20-70° C. for 3-24 h to obtain surface-modified inorganic nanoparticles (containing polymerizable double bond);

(3) adding the inorganic nanoparticles obtained in the step (2) to a deionized water solution containing a dispersant which accounts for 2-15% of the total mass of (meth)acrylate monomer, unsaturated carboxylic acid monomer, vinyl hydrocarbon monomer and optionally other copolymerizable monomer, carrying out dispersion for not less than 20 minutes with an emulsifying and dispersing machine at 800-3,000 rpm, and then adding (meth)acrylate monomer, unsaturated carboxylic acid monomer, vinyl hydrocarbon monomer, optionally other copolymerizable monomer and initiator and carrying out polymerization reaction for 3-6 h under stirring to prepare and inorganic-organic seed composite emulsion;

(4) adding (meth)acrylate monomer, unsaturated carboxylic acid monomer, vinyl hydrocarbon monomer, optionally other copolymerizable monomer and initiator to the inorganic-organic seed composite emulsion obtained in the step (3) at 60-90° C., and carrying out polymerization reaction under stirring;

(5) alkali neutralization to obtain an inorganic-organic composite emulsion having a pH of 6-10, that is, an aqueous binder for a lithium ion battery.

The third purpose of the present invention is to provide a use of the aqueous binder for a lithium ion battery as described above, which is a use for a lithium ion battery.

Compared with the prior art, the present invention has the following beneficial effects.

When the water-soluble cellulose grafted with amphiphilic copolymer is used as the dispersant, the present invention can avoid agglomeration of nanoparticles during the film formation of the binder, and at the same time the effects of toughening and improving the binding strength are achieved. Meanwhile, the water-soluble cellulose has certain strengthening and toughening properties so that the aqueous binder of the present invention has an excellent anti-tensile performance.

In addition, the inorganic nanoparticles of the present invention are surface-modified with a silane coupling agent, and thus can polymerize to form a network structure, which enhances bonding strength and solvent resistance, thereby giving the binder uniform dispersion of stress. At the same time, the rigid inorganic nanoparticle core structure gives the binder a certain high temperature resistance. In addition, the multilayer core-shell structure gives the binder cohesive force and flexibility.

DETAILED DESCRIPTION

Figure 1:
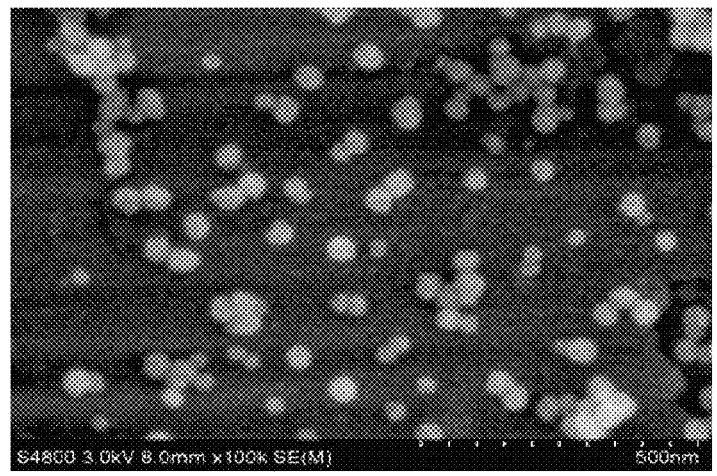
FIG. 1 is a SEM image of the surface-modified nano-silica of Example 1.

The technical solutions of the present disclosure are further explained by specific examples in combination with the drawings hereinafter.

Example 1

Surface Modification of Inorganic Nanoparticles: 20 parts by mass of silica having an average particle size of 50 nm were dispersed in a mixture of ethanol and deionized water, ammonia water was added to adjust pH to 8-10 under stirring at room temperature, and 2 parts by mass of vinyl triethoxysilane were added. Then the mixture was heated to 70° C. and reacted for 1 h before being cooled to room temperature to obtain surface-modified nano-silica.

Preparation of Dispersant: 2.5 parts by mass of hydroxyethyl cellulose were dissolved in 250 parts by mass of deionized water. Then the solution was heated to 75° C., and was previously neutralized with 20% alkaline aqueous solution of lithium hydroxide to pH=5-8. Then 0.6 parts by mass of ammonium persulfate were added therein, and 2 parts by mass of hydrophilic monomer sodium p-styrene sulfonate, 8 parts by mass of methacrylic acid, 10 parts by mass of hydrophobic monomer butyl acrylate, 0.06 parts by mass of crosslinking monomer glycidyl acrylate were added therein.

Inorganic-organic seed composite emulsion: 250 parts by mass of the dispersant solution prepared above and 2 parts by mass of surface-modified silica were added to 50 parts by mass of deionized water. The mixture was emulsified and dispersed at 800 rpm for 30 min. 100 parts by mass of mixed monomers containing 40 w % of methyl methacrylate (MMA), 58 w % of butyl acrylate (BA) and 2 w % of acrylic acid (AA) and 0.6 parts by mass of ammonium persulfate were added under stirring after the temperature was raised to 70° C. Then the mixture was reacted for 6 hours to obtain an inorganic-organic seed composite emulsion.

Inorganic-organic composite emulsion: 50 parts by mass of the inorganic-organic seed composite emulsion were added to 50 parts by mass of deionized water. At 75° C., 100 parts by mass of mixed monomers containing 56.6 w % of methyl methacrylate (MMA), 42.2 w % of butyl acrylate (BA) and 1.2 w % of methacrylic acid (AA) were added, with the mass ratio of core monomer to shell monomer being 1:2 (the mass ratio of core monomer to shell monomer is namely the mass ratio of the seed emulsion to the monomers added subsequently). Then the mixture was polymerized for 6 hours to obtain an inorganic-organic composite emulsion.

The obtained composite emulsion was neutralized with lithium hydroxide solution having a mass fraction of 10%, to obtain an inorganic-organic composite emulsion having a solid content of 40%.

Preparation of Battery Pole Piece

The binder described in the above examples was used in the preparation of silicon-based/graphite composite negative electrode material pole piece.

The silicon-based/graphite composite negative electrode material is preferably prepared by compositing SiOx/C or Si—C composite material containing Si and C with natural graphite or artificial graphite.

In the present invention, a silicon-based/graphite composite negative electrode material having a capacity per gram of 480 mAh/g is preferably used.

A suitable amount of deionized water (based on the total solids content being 45%) was added to a mixture of 92.0 w % (mass fraction) of silicon-based composite negative electrode material, 4.0 w % of conductive additive, 2 w % (mass fraction) of thickener sodium carboxymethyl cellulose (denoted as CMC) and 2 w % (mass fraction, based on the solid content) of the aqueous binder of the above examples (denoted as PAA), to prepare a battery pole piece slurry. The uniformly dispersed slurry was passed through a 100-mesh screen, then coated on a 10-μm-thick copper foil which was used as a current collector, dried at 120° C. for 5 minutes, and then rolled at a load per length of $10 \times 10^4$ N/m at room temperature to obtain an electrode pole piece.

Example 2

An aqueous binder was prepared in the same manner as in Example 1, except that sodium carboxymethyl cellulose was used in the preparation of the dispersant.

Example 3

An aqueous binder was prepared in the same manner as in Example 1, except that 10 parts by mass of hydrophilic monomer acrylic acid and 10 parts by mass of the hydrophobic monomer butyl acrylate were used as monomers in the preparation of the dispersant.

Example 4

An aqueous binder was prepared in the same manner as in Example 1, except that 12 parts by mass of hydrophilic monomer sodium p-styrene sulfonate, 18 parts by mass of hydrophilic monomer methacrylic acid, and 20 parts by mass of hydrophobic monomer butyl acrylate were used as monomers in the preparation of the dispersant.

Example 5

Different from Example 2, hydrophilic monomers, that is, 2 parts by mass of sodium styrene sulfonate and 8 parts by mass of methacrylic acid, were replaced with 10 parts by mass of amphiphilic monomer lauryl alcohol polyoxyethylene ether methacrylate.

Example 6

Different from Example 1, the crosslinking monomer was replaced by n=5, (ethylene glycol)$_5$ diacrylate.

Example 7

An aqueous binder was prepared in the same manner as in Example 1, except that the added amount of nano-silica was reduced from 2 parts by mass to 1 part by mass in the preparation of inorganic-organic composite seed emulsion.

Example 8

Different from Example 2, the mass ratio of core monomer to shell monomer is 1:1.

Example 9

Different from Example 2, the mass ratio of core monomer to shell monomer is 4:1.

Comparative Example 1

Commercially available SBR from a company was used as a binder to prepare negative electrode pole piece according to the above examples. SBR binder was surface-carboxyl-modified styrene and butadiene copolymers prepared using a small molecule emulsifier.

Comparative Example 2

Commercially available acrylic resin LA from a company was used as a binder to prepare negative electrode pole piece according to the above examples. LA binder was a water-soluble polyacrylic latex having a linear structure and not containing a emulsifier.

Comparative Example 3

Binder PAA was prepared according to Example 2, with the sole exception that sodium dodecyl sulfonate/alkylphenol polyoxyethylene ether composite emulsifier was used as the dispersing agent to prepare the binder, and a negative electrode pole piece was prepared according to the above examples.

Comparative Example 4

Binder PAA was prepared according to Example 2, with the sole exception that no water-soluble cellulose was contained in the preparation of dispersant, and a binder was prepared. In addition to the above matters, a lithium ion battery was prepared according to Example 1 and evaluated.

Comparative Example 5

Binder PAA was prepared according to Example 2, with the sole exception that no inorganic nanoparticle was contained, and a binder was prepared. In addition to the above matters, a lithium ion battery was prepared according to Example 2 and evaluated.

Comparative Example 6

Comparative Example 6 presents an inorganic-organic composite emulsion having a core-shell structure obtained by Example 1 disclosed in CN1944479A. A lithium ion battery was prepared according to Example 1 and evaluated.

The following performance measurement and evaluation were conducted on the aqueous binders for lithium ion secondary battery prepared by the method of the present disclosure, and relevant pole piece formulas and test evaluation results are shown in Table 1 and Table 2.

(Measurement of Average Particle Size)

Measurements of average particle size and particle size distribution of inorganic-organic composite polymers were conducted by a laser particle analyzer.

(Measurement of Glass Transition Temperature)

Thermal analysis of inorganic-organic composite emulsions were conducted by a DSC thermal analyzer.

(Determination of Peeling Strength)

The electrode pole pieces of examples and comparative examples were cut into strips having a size of 10 cm×2 cm. A 1 mm-thick steel plate was bonded to the current collector side with a double-sided adhesive tape, and a transparent adhesive tape was attached to the coating layer side. A tensile test machine was used to peel toward a direction of 180° at a speed of 100 mm/min, and to determine peeling strength.

(Evaluation of Flexibility of Pole Pieces)

A mandril having a diameter $\phi$=3 mm was placed on the side of current collector of rolled pole pieces of the examples and the comparative examples, and bending test was performed. The state of the pole piece at this time was observed with a light microscope. If the pole piece was intact, it is marked as ○; if shedding or cracking occurs, it is marked as x.

(Evaluation of Battery Performance)

Analog batteries were prepared by using the above pole pieces, and the first coulombic efficiency of charge and discharge cycle thereof and the coulombic efficiency and the capacity retention rate after 50 cycles thereof were measured by using a constant current method. After 50 charge and discharge cycles, the ratio of the increased thickness value of pole piece in the state of lithium insertion of the pole piece to the thickness value of the pole piece prior to charging and discharging is recorded as pole piece expansion rate (%).

TABLE 1

|  | Binders | | Active materials | | Conductive additives | |
| --- | --- | --- | --- | --- | --- | --- |
|  | Type | Amount (parts) | Type | Amount (parts) | Type | Amount (parts) |
| Example 1 | CMC/PAA | 2/2 | Silicon-based/graphite | 92.0 | SP/KS-6 | 2/2 |
| Example 2 | CMC/PAA | 2/2 | Silicon-based/graphite | 92.0 | SP/KS-6 | 2/2 |
| Example 3 | CMC/PAA | 2/2 | Silicon-based/graphite | 92.0 | SP/KS-6 | 2/2 |
| Example 4 | CMC/PAA | 2/2 | Silicon-based/graphite | 92.0 | SP/KS-6 | 2/2 |
| Example 5 | CMC/PAA | 2/2 | Silicon-based/graphite | 92.0 | SP/KS-6 | 2/2 |
| Example 6 | CMC/PAA | 2/2 | Silicon-based/graphite | 92.0 | SP/KS-6 | 2/2 |
| Example 7 | CMC/PAA | 2/2 | Silicon-based/graphite | 92.0 | SP/KS-6 | 2/2 |
| Example 8 | CMC/PAA | 2/2 | Silicon-based/graphite | 92.0 | SP/KS-6 | 2/2 |
| Example 9 | CMC/PAA | 2/2 | Silicon-based/graphite | 92.0 | SP/KS-6 | 2/2 |
| Comparative Example 1 | CMC/SBR | 2/2 | Silicon-based/graphite | 92.0 | SP/KS-6 | 2/2 |
| Comparative Example 2 | CMC/LA | 0.5/3.5 | Silicon-based/graphite | 92.0 | SP/KS-6 | 2/2 |
| Comparative Example 3 | CMC/PAA | 2/2 | Silicon-based/graphite | 92.0 | SP/KS-6 | 2/2 |
| Comparative Example 4 | CMC/PAA | 2/2 | Silicon-based/graphite | 92.0 | SP/KS-6 | 2/2 |
| Comparative Example 5 | CMC/PAA | 2/2 | Silicon-based/graphite | 92.0 | SP/KS-6 | 2/2 |
| Comparative Example 6 | CMC/PAA | 2/2 | Silicon-based/graphite | 92.0 | SP/KS-6 | 2/2 |

Negative electrode pole pieces were prepared according to the formulas in Table 1, and were assembled into lithium-ion batteries.

TABLE 2

| Evaluation Items | Example 1 | Example 2 | Example 3 | Example 4 | Example 5 | Example 6 | Example 7 |
| --- | --- | --- | --- | --- | --- | --- | --- |
| $T_g$ (° C.) | 0.1, 31 | −2, 32 | −0.2, 36 | −5, 40 | −0.5, 35 | −1.5, 35 | −3, 30 |
| Particle size (nm) | 350.6 | 280.2 | 380.3 | 290.7 | 260.5 | 420.1 | 270.1 |
| Peeling strength (mN/mm) | 3.9 | 3.6 | 3.8 | 4.1 | 3.5 | 3.3 | 3.1 |
| Flexibility of pole piece | ○ | ○ | ○ | ○ | ○ | ○ | ○ |
| First discharge capacity (mAh) | 480 | 480 | 480 | 480 | 480 | 480 | 480 |
| First coulombic efficiency | 88 | 88 | 88 | 88 | 88 | 88 | 88 |
| Capacity retention rate after 50 cycles (%) | 91.1 | 92.1 | 91.6 | 88.9 | 89.5 | 88.8 | 90.1 |
| pole piece expansion rate after 50 cycles (%) | 47.6 | 48.2 | 47.0 | 49.1 | 48.1 | 48.1 | 49.1 |

TABLE 3

| Evaluation Items | Example 8 | Example 9 | Comparative Example 1 | Comparative Example 2 | Comparative Example 3 | Comparative Example 4 | Comparative Example 5 | Comparative Example 6 |
|---|---|---|---|---|---|---|---|---|
| $T_g$ (° C.) | −0.5, 35 | −3, 35 | 18 | −5.1, 28 | −0.1, 36 | −5, 34 | −5, 32 | −40 |
| Particle size (nm) | 310.4 | 380.1 | 180 | 5000 | 260 | 510.1 | 270.1 | 450 |
| Peeling strength (mN/mm) | 3.4 | 3.1 | 1.1 | 2.0 | 5.2 | 1.1 | 1.7 | 2.8 |
| Flexibility of pole piece | ○ | ○ | ○ | ○ | ○ | ○ | ○ | ○ |
| First discharge capacity (mAh) | 480 | 480 | 480 | 480 | 480 | 480 | 480 | 480 |
| First coulombic efficiency | 88 | 88 | 88 | 88 | 88 | 88 | 88 | 88 |
| Capacity retention rate after 50 cycles (%) | 89.6 | 86.7 | 90.1 | 74.4 | 70.1 | 76.1 | 85.1 | 65.1 |
| pole piece expansion rate after 50 cycles (%) | 48.6 | 50.2 | 57 | 60 | 65 | 62.1 | 58.1 | 68.1 |

As can be seen from Table 2 and Table 3 above, the electrodes using the binders according to Examples 1-9 of the present disclosure show considerably higher adhesive force and have high capacity retention rate after 50 charge and discharge cycles compared to the electrodes using the binders according to Comparative Examples 1-5, and pole piece expansion rates of the electrodes using the binders according to Examples 1-9 are all lower than that of Comparative Examples 1-5. Meantime, it can be seen that Comparative Example 3 has slightly high peeling strength, however low capacity retention rate and high pole piece expansion rate, since the binder is prepared by polymerizing inorganic-organic composite emulsion using small-molecule emulsifier. In Comparative Example 4 and Comparative Example 5, the prepared binders has lower peeling strength and higher pole piece expansion rate, since the water-soluble cellulose and inorganic nanoparticles described in the present disclosure are not contained therein. Comparative Example 6 prepared a binder according to Example 1 disclosed in CN 1944479A and prepared a lithium ion battery, and shows low capacity retention rate and high pole piece expansion rate after 50 charge and discharge cycles.

Figure 2:
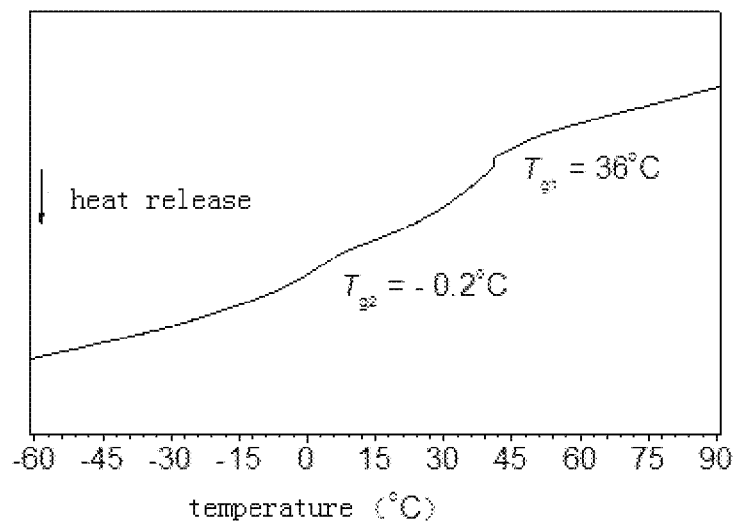
FIG. 2 is a DSC chart of the binder of Example 3.

FIG. 1 is a SEM image of the surface-modified nano-silica prepared in Example 1, showing that the particle size of the surface-modified nano-silica is ~60 nm. FIG. 2 is a DSC chart of the binder prepared in Example 3, showing the inorganic-organic composite polymer has a multi-phase structure and double glass transition temperatures.

The applicant states that the present disclosure illustrates the detailed methods of the present disclosure by the above examples, but the present disclosure is not limited to the above detailed methods, that is to say, it does not mean that the present disclosure must be conducted relying on the above detailed methods. Those skilled in the art should understand that any modification to the present disclosure, any equivalent replacement of each raw material of the products of the present disclosure and the addition of auxiliary ingredients, the selection of specific embodiment and the like all fall into the protection scope and the disclosure scope of the present disclosure.

The invention claimed is:

1. An aqueous binder for a lithium ion battery, wherein the binder is an inorganic-organic composite emulsion comprising a dispersant, inorganic nanoparticles, and copolymers of (methyl)acrylate monomers, unsaturated carboxylic acid monomers, alkenyl-containing monomers and optionally other copolymerizable monomers, wherein the dispersant is a water-soluble cellulose grafted with amphiphilic copolymer;

wherein, the alkenyl-containing monomers are selected from any one of vinyl acetate, styrene, α-methyl styrene, sodium styrene sulfonate or sodium methyl vinyl sulfonate, or a combination of at least two of them.

2. The aqueous binder of claim 1, wherein the dispersant is in an amount of 0.5-25 wt % of the total mass of solids of the composite emulsion;

wherein, the mass ratio of water-soluble cellulose to amphiphilic copolymer is 2/98 to 40/60;
wherein, the dispersant has a weight average molecular weight of 100-1,000,000.

3. The aqueous binder of claim 1, wherein the water-soluble cellulose is any one of sodium carboxymethylcellulose, sodium carboxyethylcellulose, hydroxymethylcellulose, hydroxyethylcellulose or hydroxypropylcellulose, or a mixture of at least two of them;

wherein, the water-soluble cellulose contains a hydroxyl group capable of grafting, and the hydroxyl group has a mass of 10-20 wt % of the mass of the water-soluble cellulose.

4. The aqueous binder of claim 1, wherein the comonomers of the amphiphilic copolymer comprise hydrophilic monomer, hydrophobic monomer, optionally amphiphilic monomer, and optionally crosslinking monomer;

wherein, the mass ratio of the hydrophilic monomer to the hydrophobic monomer is 10/100 to 80/20;
wherein, the amphiphilic monomer is added in an amount of 0-40 wt % of the mass of the amphiphilic copolymer;
wherein, if present, the crosslinking monomer is added in an amount of 0.01-5 wt % of the mass of the amphiphilic copolymer;
wherein, the hydrophilic monomer is selected from any one of fumaric acid, (meth)acrylic acid, itaconic acid, sodium p-styrene sulfonate, sodium vinylsulfonate, sodium allylsulfonate, sodium 2-methylallyl sulfonate, sodium ethyl methacrylate sulfonate, (meth)acrylamide, N-methylol acrylamide, N,N-dimethylacrylamide or 2-acrylamide-2-methylpropanesulfonic acid, or a combination of at least two of them;
wherein, the hydrophobic monomer is selected from any one of styrene, methyl (meth)acrylate, ethyl (meth)

acrylate, butyl (meth)acrylate or 2-ethylhexyl (meth) acrylate, or a combination of at least two of them;

wherein, the amphiphilic monomer is selected from any one of lauryl alcohol polyoxyethylene ether (meth) acrylate, stearic acid polyoxyethylene ether (meth) acrylate or nonylphenol polyoxyethylene ether (meth) acrylate, or a combination of at least two of them;

wherein, the crosslinking monomer is selected from any one of glycidyl (meth)acrylate, methylene bisacrylamide, divinylbenzene or (ethylene glycol)$_n$ di(meth)acrylate, or a combination of at least two of them, wherein n=1-35.

5. The aqueous binder of claim 1, wherein the inorganic nanoparticles are any one of nano-silica, alumina, aluminum silicate, calcium sulfate or wollastonite, or a combination of at least two of them.

6. The aqueous binder of claim 5, the inorganic nanoparticles are surface-modified by a silane coupling agent;
wherein the mass ratio of the silane coupling agent to inorganic nanoparticles is 0.01-0.3/1;
wherein, the silane coupling agent is any one of vinyltrimethoxysilane, vinyltriethoxysilane, vinyltris(β-methoxyethoxy)silane, γ-methacryloxypropyl trimethoxysilane or γ-methacryloxypropyltriethoxysilane, or a combination of at least two of them.

7. The aqueous binder of claim 1, wherein the (meth) acrylate monomers are selected from any one of methyl acrylate, ethyl acrylate, butyl acrylate, isobutyl acrylate, n-pentyl acrylate, isoamyl acrylate, n-hexyl acrylate, isooctyl acrylate, hydroxypropyl acrylate, 2-hydroxyethyl acrylate, lauryl acrylate, methyl methacrylate, ethyl methacrylate, butyl methacrylate, isobutyl methacrylate, n-pentyl methacrylate, n-hexyl methacrylate, isooctyl methacrylate, hydroxypropyl methacrylate or 2-hydroxyethyl methacrylate, or a combination of at least two of them;
wherein, the unsaturated carboxylic acid monomers are selected from any one of lithium acrylate, acrylic acid, lithium methacrylate, methacrylic acid, lithium itaconate or itaconic acid, or a combination of at least two of them;
wherein, said other copolymerizable monomers are selected from any one of acrylamide, N-methylolacrylamide, N-vinylpyrrolidone, vinylpyridine, vinylimidazole, vinyl acetate, vinyl propionate or vinyl butyrate, or a mixture of at least two of them.

8. The aqueous binder of claim 1, wherein the mass ratio of inorganic nanoparticles to copolymers of (methyl)acrylate monomers, unsaturated carboxylic acid monomers, alkenyl-containing monomers and optionally other copolymerizable monomers is 0.001-6/99.999-94;
wherein, the sum of mass of the inorganic nanoparticles and the copolymers of (methyl)acrylate monomers, unsaturated carboxylic acid monomers, alkenyl-containing monomers and optionally other copolymerizable monomers is 25-55 wt % of the mass of the composite emulsion.

9. The aqueous binder of claim 8, wherein the composite emulsion has a core-shell structure, wherein the core-shell structure has more than one shell layer with the inorganic nanoparticles as the cores;
wherein an innermost layer of the shell layers has a glass transition temperature lower than that of an outermost layer of the shell layers;
wherein the glass transition temperatures of adjacent shell layers differ by −30 to 30° C., and the glass transition temperature of the innermost shell layer is −25 to 30° C.;
wherein, the composite emulsion has a glass transition temperature of −30 to 90° C.;
wherein, the composite emulsion has a pH of 6-10;
wherein, the composite emulsion has a solid content of 25-55 wt %.

10. A method for producing the aqueous binder for a lithium ion battery of claim 1, comprising in-situ polymerizing the dispersant, the inorganic nanoparticles and the (meth)acrylate monomers, the unsaturated carboxylic acid monomers, the alkenyl-containing monomers, and optionally other copolymerizable monomers, to obtain the above aqueous binder;
wherein the dispersant is prepared by free radical polymerization of the water-soluble cellulose and comonomers of the amphiphilic copolymer.

11. The method of claim 10, wherein the mass ratio of the water-soluble cellulose to the amphiphilic copolymer is 2/98 to 40/60;
wherein, the comonomers of the amphiphilic copolymer comprise hydrophilic monomer, hydrophobic monomer, optionally amphiphilic monomer, and optionally crosslinking monomer;
wherein, the mass ratio of the hydrophilic monomer to the hydrophobic monomer is 10/100 to 80/20;
wherein, the amphiphilic monomer is added in an amount of 0-40 wt % of the mass of the amphiphilic copolymer;
wherein, the crosslinking monomer, if present, is added in an amount of 0.01-5 wt % of the mass of the amphiphilic copolymer.

12. The method of claim 10, wherein when preparing the dispersant, a chain transfer agent is added in an amount of 0.01-5% of the mass of the comonomers of the amphiphilic copolymer;
wherein, the chain transfer agent is selected from any one of dodecyl mercaptan, tert-dodecyl mercaptan or isooctyl thioglycolate, or a combination of at least two of them.

13. The method of claim 10, wherein the dispersant is prepared using a free radical polymerization system, wherein the radical polymerization system is previously neutralized with a 10-20% alkaline compound aqueous solution to a pH of 5-8;
wherein, the alkaline compound is any one of lithium hydroxide, sodium hydroxide, potassium hydroxide or sodium bicarbonate, or a combination of at least two of them.

14. The method of claim 10, wherein the water-soluble cellulose contains a hydroxyl group capable of grafting, and the hydroxyl group has a mass fraction of 10-20 wt % of the mass of the water-soluble cellulose.

15. The method of claim 10, wherein the inorganic nanoparticles are surface-modified with a silane coupling agent, and the surface modification method is as follows:
the silane coupling agent is added to an alcohol-water solution of the inorganic nanoparticles and the pH of the solution is adjusted to 8-10, and then the mixture was stirred and reacted at 20-70° C. for 3-24 hours to obtain surface-modified inorganic nanoparticles;
wherein, the mass ratio of the silane coupling agent to the inorganic nanoparticles is 0.01-0.3/1;
wherein, the silane coupling agent is any one of vinyltrimethoxysilane, vinyltriethoxysilane, vinyltris(β-methoxyethoxy)silane, γ-methacryloxypropyl trimethoxysilane or γ-methacryloxypropyltriethoxysilane, or a combination of at least two of them.

16. The method of claim 10, wherein the in-situ polymerization of the dispersant, the inorganic nanoparticles and the (meth)acrylate monomers, the unsaturated carboxylic acid monomers, the alkenyl-containing monomers, and the optionally other copolymerizable monomers includes the following steps:
- (a) adding the inorganic nanoparticles to an aqueous solution of the dispersant, and after dispersing, adding a portion of the (meth)acrylate monomers, the unsaturated carboxylic acid monomers, the alkenyl-containing monomers, and the optionally other copolymerizable monomers and an initiator; carrying out polymerization under stirring to obtain an inorganic-organic seed composite emulsion;
- (b) adding an additional portion of the (meth)acrylate monomers, the unsaturated carboxylic acid monomers, the alkenyl-containing monomers, the optionally other copolymerizable monomers and the initiator to the inorganic-organic seed composite emulsion, and carrying out polymerization under stirring to obtain an inorganic-organic composite emulsion.

17. The method of claim 16, wherein step (b) is repeated 1-3 times;
wherein, in step (a), the dispersant is in an amount of 1-25% of the total mass of the (meth)acrylate monomers, the unsaturated carboxylic acid monomers, the alkenyl-containing monomers and the optionally other copolymerizable monomers;
wherein, in step (a), the mass fraction of the inorganic nanoparticles is 0.1-25 wt % of the solid mass of the dispersant;
wherein, in step (a), the dispersion is performed for not less than 20 minutes with an emulsifying and dispersing machine at 300-3,000 rpm to disperse the inorganic nanoparticles;
wherein, the polymerization reaction time in step (a) is 3-6 h;
wherein, in both step (a) and step (b), the comonomers and the initiator are added and polymerization is performed independently at 30-90° C.;
wherein, the initiator is any one of organic peroxide initiator, inorganic peroxide initiator or redox initiator, or a combination of at least two of them;
wherein, the organic peroxide initiator is selected from benzoyl peroxide and/or dicumyl peroxide;
wherein, the inorganic peroxide initiator is selected from ammonium persulfate, sodium persulfate or potassium persulfate;
wherein, the redox initiator is selected from a combination of ammonium persulfate/sodium sulfite, or a combination of ammonium persulfate/sodium bisulfite;
wherein, the mass of the initiator is 0.1-2 wt % of the total mass of the (meth)acrylate monomers, the unsaturated carboxylic acid monomers, the alkenyl-containing monomers, and the optionally other copolymerizable monomers;
wherein, the mass of the (meth)acrylate monomers, the unsaturated carboxylic acid monomers, the alkenyl-containing monomers and the optionally other copolymerizable monomers in step (b) is 15-85 wt % of the total mass of the (meth)acrylate monomers, the unsaturated carboxylic acid monomers, the alkenyl-containing monomers, and the optionally other copolymerizable monomers.

18. The method of claim 16, wherein the method further comprises: adjusting the pH of the composite emulsion when the polymerization reaction is completed, wherein adjusting the pH of the composite emulsion is to be a pH of 6-10;
wherein, this pH adjustment is achieved by alkali neutralization;
wherein, the inorganic-organic seed composite emulsion has a glass transition temperature of −30 to 90° C.;
wherein, the inorganic-organic composite emulsion has a glass transition temperature of −30 to 90° C.

19. The method of claim 16, wherein the method for preparing the aqueous binder for a lithium ion battery includes the following steps:
- (1) preparing a the dispersant by free radical polymerization of the water-soluble cellulose and comonomers of the amphiphilic copolymer;
- (2) adding a silane coupling agent to an alcohol-water mixed solution of the inorganic nanoparticles, adjusting the pH to 8-10 with ammonia, and then stirring and reacting the mixture at 20-70° C. for 3-24 h to obtain surface-modified inorganic nanoparticles;
- (3) adding the surface-modified inorganic nanoparticles obtained in the step (2) to a deionized water solution containing the dispersant which accounts for 2-15% of the total mass of the (meth)acrylate monomers, the unsaturated carboxylic acid monomers, the alkenyl-containing monomers and the optionally other copolymerizable monomers, carrying out dispersion for not less than 20 minutes with an emulsifying and dispersing machine at 800-3,000 rpm, and then adding a portion of the (meth)acrylate monomers, the unsaturated carboxylic acid monomers,
the alkenyl-containing monomers, the optionally other copolymerizable monomers and initiator and carrying out polymerization reaction for 3-6 h under stirring to prepare an inorganic-organic seed composite emulsion;
- (4) adding an additional portion of the (meth)acrylate monomers, the unsaturated carboxylic acid monomers, the alkenyl-containing monomers, the optionally other copolymerizable monomers and the initiator to the inorganic-organic seed composite emulsion obtained in the step (3) at 60-90° C., and carrying out polymerization reaction under stirring;
- (5) alkali neutralization to obtain an inorganic-organic composite emulsion having a pH of 6-10, that is, an aqueous binder for a lithium ion battery.

20. A lithium ion battery comprising the aqueous binder of claim 1.

* * * * *